US006428764B1

(12) United States Patent
Michel et al.

(10) Patent No.: US 6,428,764 B1
(45) Date of Patent: Aug. 6, 2002

(54) PROCESS FOR THE PRODUCTION OF CALCIUM FLUORIDE

(75) Inventors: John Byrne Michel, West Chester; Paul Douglas Vernooy, Media, both of PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/565,352

(22) Filed: May 5, 2000

Related U.S. Application Data

(60) Provisional application No. 60/133,082, filed on May 7, 1999.

(51) Int. Cl.⁷ .............................. C01B 25/22; C01F 11/22
(52) U.S. Cl. ...................... 423/490; 423/483; 423/484; 423/157.3
(58) Field of Search .................. 423/490, 483, 423/484, 157.3, 158, 339

(56) References Cited

U.S. PATENT DOCUMENTS

| 4,053,302 A | * | 10/1977 | NAfziger et al. | .......... 75/10.35 |
| 4,132,765 A | * | 1/1979 | Yates | .......................... 423/484 |
| 5,531,975 A | * | 7/1996 | Erickson et al. | ............ 423/490 |
| 6,224,844 B1 | * | 5/2001 | VerNooy et al. | ............ 423/490 |

* cited by examiner

*Primary Examiner*—Ngoc-Yen Nguyen
(74) *Attorney, Agent, or Firm*—J. E. Shipley

(57) ABSTRACT

A process is disclosed for producing calcium fluoride. The process comprises (a) mixing phosphate rock with aqueous $H_2SiF_6$ at ambient temperature for at least one hour; (b) nucleating the calcium fluoride in the slurry prepared in step (a) by reacting the slurry at a temperature and for a time sufficient to initiate and sustain nucleation of calcium fluoride and $SiO_2$ by-product; (c) aggregating the $SiO_2$ by-product by heating the slurry produced in step (b) at a temperature of about 90° C. to about 105° C. for at least 0.5 hours; and (d) recovering a calcium fluoride-containing product of an average particle size of less than 1 micron.

15 Claims, No Drawings

PROCESS FOR THE PRODUCTION OF CALCIUM FLUORIDE

This application claims priority from provisional application No.60/133,082, filed May 7, 1999.

FIELD OF THE INVENTION

This invention relates to a process for the manufacture of calcium fluoride and more particularly to its production by the reaction of fluorosilicic acid (i.e., FSA or aqueous $H_2SiF_6$) with phosphate rock containing fluoroapatite.

BACKGROUND

Fluorine, the essential element for fluorochemicals and fluoropolymers, is currently derived from fluorspar, a mineral which is a crystalline form of calcium fluoride. Reserves of fluorspar are rapidly being depleted. Furthermore, the United States currently imports about 90% of its supply.

An important reserve of fluorine is contained in fluoroapatite, i.e., $CaF_2 \cdot 3Ca_3(PO_4)_2$, a mineral which is used for the manufacture of phosphoric acid. This mineral constitutes a fluorine reserve which is about four times greater than the proven reserves of fluorspar. During the manufacture of phosphoric acid from fluoroapatite, most of the fluorine is removed as fluorosilicic acid (FSA). There is some demand for FSA for fluoridating drinking water and for the manufacture of cryolite and aluminum fluoride. However, since this demand is small, most of the fluorine produced during phosphoric acid manufacture is sent to a waste-water pond. This can cause a fluorine pollution problem.

Over the years numerous processes, several of which are described below, have been developed to recover the fluorine from phosphate minerals. The United States Bureau of Mines (Chem. Abst., 75:23270, 1971) has shown how waste fluorosilicic acid can be converted to an acid-grade fluorspar ($CaF_2$). A first step involves treating the FSA with ammonia to precipitate silica, which is removed by filtration, and form $NH_4F$. In a second step ammonium fluoride is treated with lime to form $CaF_2$.

U.S. Pat. No. 5,531,975 describes a process for reacting phosphate rock and FSA to produce a slurry comprising phosphoric acid, calcium fluoride, silicon dioxide and undigested phosphate rock. An excess stoichiometric amount of calcium to fluorine is initially present in the slurry. The product slurry is pumped into a vacuum filter or centrifuge where the phosphoric acid and colloidal calcium fluoride are separated from the undigested phosphate rock and silica. In Example 1, the weight ratio of F:Si in the product (initial filtrate) is shown to be about 30:1.

We have discovered a process which, surprisingly, is more efficient for producing calcium fluoride from fluorosilicic acid and with a much higher recovery of fluorine from the acid than previously reported. The calcium fluoride produced also contains much lower levels of silica. Moreover, the process may be run in a continuous manner.

SUMMARY OF THE INVENTION

This invention provides a process for producing calcium fluoride comprising:

(a) mixing phosphate rock with aqueous $H_2SiF_6$ at ambient temperature for at least one hour;

(b) nucleating the calcium fluoride in the slurry prepared in step (a) by reacting the slurry at a temperature and for a time sufficient to initiate and sustain nucleation of calcium fluoride and $SiO_2$ by-product;

(c) aggregating the $SiO_2$ by-product by heating the slurry produced in step (b) at a temperature of about 90° C. to about 105° C. for at least 0.5 hours;

(d) recovering a calcium fluoride-containing product of an average particle size of less than 1 micron.

DETAILED DESCRIPTION

The phosphate rock useful in the current process is any naturally occurring phosphate rock and typically is comprised primarily of tricalcium phosphate ($Ca_3(PO_4)_2$), calcium carbonate ($CaCO_3$) and calcium fluoride ($CaF_2$). This phosphate rock may also be used for the manufacture of phosphoric acid. The phosphate rock is preferably used as a rock powder or as a water-slurried rock powder.

The concentration and source of aqueous $H_2SiF_6$ used in this process is not critical. The aqueous fluorosilicic acid (FSA) produced by a phosphate plant may be used, which is typically 20 to 30% by weight $H_2SiF_6$. By FSA is meant a solution of 20 to 30% by weight $H_2SiF_6$ in water.

The reaction of phosphate rock with fluorosilicic acid can be carried out in a single reactor, more preferably in two reactors connected in series or most preferably in three reactors connected in series. Surprisingly, it has been found that the conditions required for optimum rock dissolution in fluorosilicic acid, nucleation of $CaF_2$, and nucleation and growth of the $SiO_2$ by-product are sufficiently diverse that the reaction is optimally performed in three separate reactors connected in series.

In a single reactor embodiment, dry phosphate rock powder or water-slurried phosphate rock powder and FSA feed solution (prepared by diluting aqueous $H_2SiF_6$ with water and optionally adding a surfactant) are continuously co-fed to the reactor. Product slurry is continuously removed. Reaction conditions are typically a reaction temperature of about 100° C. with a residence time of 1 to 2 hours.

In a two-reactor embodiment, a batch feed tank feeding a continuous stirred tank reactor (CSTR) is used. In this mode dry phosphate rock powder or waterslurried phosphate rock powder and FSA feed solution are added batchwise to a large stirred tank at ambient temperature. The residence time is such that the calcium fluoride product is nucleated, typically at least 10 hours. The slurry from the batch feed tank is fed continuously to a CSTR. The CSTR is typically maintained at about 100° C. with a residence time of 1 to 2 hours.

In a three-reactor embodiment, phosphate rock powder or water-slurried phosphate rock powder (preferably the slurry concentration is equal to or greater than about 70% solids by weight) and fluorosilicic acid are continuously co-fed to the first reactor, with continuous stirring at ambient temperature. Residence times in this reactor can vary between 1 to 36 hours depending on the water content and the reactivity of the rock feed.

The contents of the first reactor are continuously pumped to the second reactor. At the beginning of the run, the second reactor is heated to a temperature sufficient to initiate nucleation of calcium fluoride, typically about 75° C. to about 90° C. After nucleation has occurred, the reactor may be cooled to a lower temperature sufficient to sustain nucleation, typically 30° C. to 50° C. Alternatively, nucleation can be initiated by addition of HF to the reaction slurry or by use of a previous run's product slurry which contains calcium fluoride. The residence times are typically between about 5 minutes to about 2 hours.

The contents of the second reactor are continuously pumped to the third reactor, also a CSTR. The third reactor is maintained at a temperature of about 90° C. to about 105° C. throughout the reaction, with a residence time of about 0.5 to 3 hours. In this reactor the silica by-product is agglomerated to a particle size which will facilitate separation of the colloidal calcium fluoride product from the silica, typically about 10 microns. The contents of the third reactor are continuously pumped to product collection.

In another embodiment of a three-reactor system, the second CSTR reactor is replaced by a plug-flow type reactor, e.g., a pipe or a coil constructed of a material compatible with both the reactants and products such as steel, copper or Teflon® (polytetrafluoroethylene) heated at about 100° C., with a residence time of a few minutes.

From the above description, it can be seen that in the three-reactor embodiment, the temperature of the second reactor can be between about 30° C. to about 100° C.

The calcium fluoride product contains $CaF_2$ microcrystals embedded in an amorphous calcium phosphate matrix. The as-recovered product is a slurry of solid calcium fluoride product suspended in about 32 wt. % aqueous phosphoric acid. The molar ratio of calcium fluoride to phosphate in the washed, dried solid is from about 2 to 10. The ratio depends on the concentration of the phosphoric acid in the slurry, the extent of washing of the dry solid calcium fluoride product and the solvent used. In a second step excess sulfuric acid is mixed with this suspension or with the dried product and heated to about 1 00° C. to produce hydrogen fluoride, preferably containing less than about 36 wt. % water.

In still another embodiment, the calcium fluoride product may be separated from the phosphoric acid by mixing the suspension with an organic solvent that is miscible with phosphoric acid, such as methanol, ethanol or isopropanol, to reduce the calcium fluoride product solubility and to increase the product separation rate.

The calcium fluoride product may be recovered by any solid-liquid separation technique such as filtration, decantation or centrifugation. Separation may be done using the hot slurry, or the mixture may be cooled prior to the separation. The reaction and separation steps can be operated either in batch or continuous modes. Recovery may include washing using standard techniques (e.g., with water following initial filtration, centrifugation or decantation). The calcium fluoride produced using this invention has a F:Si weight ratio of greater than about 50:1, preferably greater than about 99:1.

The process of this invention provides a means for producing a calcium fluoride product which does not require the elaborate silica separation steps described in the art since the calcium fluoride product is colloidal (i.e., its particle size is less than about $1\mu$) and remains suspended in the aqueous phosphoric acid by-product while the silica as well as other contaminants in the rock settle out.

Without further elaboration, it is believed that one skilled in the art can, using the description herein, utilize the present invention to its fullest extent. The following embodiments are, therefore, to be construed as merely illustrative, and do not constrain the remainder of the disclosure in any way whatsoever.

EXAMPLES

Legend

FSA is 20 to 30 wt. % $H_2SiF_6$ in water
CSTR is a continuous stirred tank reactor
Materials The phosphate rock powder used in all the examples was prepared by drying a phosphate rock slurry at approximately 100° C., then crushing, grinding, and finally sieving the product to finer than 100 mesh (0.15 mm). In runs utilizing simulated phosphate rock slurry (70% solids (w/w)) feed, a weight of water equal to 3/7 (w/w) the weight of the phosphate rock to be fed was added to the FSA during makeup of the FSA feed solution.

Two sources of phosphate rock were used, Florida and Western. The Florida phosphate rock typically contained by weight 34.1% Ca, 13.8% P, 4.3% Si, 0.62% Al, 0.97% Fe and 0.50% Na. The Western phosphate rock typically contained by weight 32.0% Ca, 12.9% P, 4.26% Si, 0.69% Al, 0.75% Fe and 0.45% Na.

The aqueous $H_2SiF_6$ used contained by weight 18–20% F and 5.5–5.8% Si. The F:Si ratio was 3.1–3.6.

The tall oil used was Westvaco CCS-500 (sample no. 1455) and diluted to a 65% aqueous solution. Typically it was about 100 ppm of the FSA feed solution when used.

Comparative Example A

A 40% phosphoric acid solution was prepared by adding 85% $H_3PO_4$ (992.8 g) to $H_2O$ (1091.3 g), then dissolving $Ca(OH)_2$ (43 g) (to facilitate $H_2SiF_6$ reaction) in the solution. The pH of the solution was −0.10. This solution (1650 mL) was added to the reactor.

With 60 SCFM (1.7 $m^3$/min) air flowing (to prevent caking of the powder) into the reactor, the starting mixture was heated to about 100° C. The flows of reactants, FSA feed solution (12.77% F and 8.80% P, prepared by mixing FSA (16.000 kg) with 85% $H_3PO_4$ (7.968 kg)) and phosphate rock powder into the reactor and slurry out of the reactor were then started. The rates of phosphate rock and FSA addition to the reactor were controlled so that the ratio of F:Ca fed was 0.75 (w/w). The FSA feed solution (14.858 kg) and phosphate rock powder (7.859 kg) were fed over a 15.2 hour period. The product slurry (22.500 kg; note this does not include the reactor contents) was collected. The residence time in the reactor was 1.85 hours.

Although the pH of the product slurry was 0 at equilibrium, and the $H_3PO_4$ concentration was 48%, centrifuging samples of the product slurry (representative of equilibrium product) at 3000 rpm for 15 minutes left little or no suspended calcium fluoride, suggesting that the calcium fluoride particles were larger than the desired submicron size. This result was confirmed by particle size distribution measurements, where there was no clear separation of the peak due to calcium fluoride from the peak due to $SiO_2$ byproduct.

This example was a continuous version of the semi-batch conditions disclosed in U.S. patent application Ser. No.60/101,198 which described a process for the production of calcium fluoride.

Example 1

The FSA and phosphate rock powder feeds were prereacted with no external heat supplied in a slurry tank equipped with a stirrer. Phosphate rock powder (11.000 kg) was added to the FSA (13.600 kg, 19.3% F) with stirring in the feed slurry tank. The mixture was stirred for 15 hours. Analysis of the feed slurry indicated it contained 12.3% F, 3.68% Si, 6.81% P and 15.86% Ca.

A 39% phosphoric acid solution was prepared by adding 85% $H_3PO_4$ (0.9935 kg) to $H_2O$ (1.091 kg), then dissolving $Ca(OH)_2$ (0.076 kg) in the solution. This solution (1650 mL) was charged to a CSTR prior to startup, then heated to approximately 100° C. At this point, the continuous flows of feed slurry into the CSTR and product slurry out of the CSTR were started. Product slurry (23.546 kg) was collected during a 14 hour run. The residence time in the reactor was 1.86 hours.

The pH of the product slurry was 0.60 at equilibrium, and the $H_3PO_4$ concentration in solution was 31%. Particle size distribution measurements indicated there was clear separation of the peak due to calcium fluoride (median particle size ranged from $0.49\mu$ early in the run to $0.56\mu$ late in the run) from the $SiO_2$ peak.

The F yield and purity of calcium fluoride in the product slurry was measured as follows: (1) the weights of FSA feed solution fed, and of product slurry recovered, from the entire experiment were measured; (2) the fluorine concentration in the FSA feed solution was measured; (3) a sample of product slurry (representative of the equilibrium product) was weighed; (4) the calcium fluoride fraction of the sample was isolated, diluted with methanol, the calcium fluoride was recovered, weighed and analyzed by elemental analysis for Ca, Si and F; (5) the purity of the recovered calcium fluoride is reported as F:Si on a weight basis. This ratio provides a measure of the effectiveness of the separation of calcium fluoride from the $SiO_2$ by-product; and (6) the F yield is reported as the percentage of the F content of the $H_2SiF_6$ fed to the reactor that is recovered in isolated calcium fluoride. The yield can exceed 100% because of the fluorine contributed by the rock. In this example the F:Si weight ratio was 187:1 and the fluorine yield was 93%.

Example 2

Phosphate rock powder (11.364 kg) was added to a solution containing $H_2SiF_6$ and $H_3PO_4$ (15.404 kg; 6.07% $H_3PO_4$, 18.7% F) with stirring in a feed slurry tank with no external heating. The mixture was stirred for 38 hours before it was fed to a CSTR. Analysis of the feed slurry, sampled at the end of the CSTR run, indicated it contained 12.6% F, 3.33% Si, 7.23% P and 14.71% Ca.

A 39% phosphoric acid solution was prepared by adding 85% $H_3PO_4$ (1.003 kg) to $H_2O$ (1.102 kg), then dissolving $Ca(OH)_2$ (0.077 kg) in the solution. This solution (1650 mL) was added to the CSTR, then heated to approximately 100° C. At this point, the flows of feed slurry into the reactor and product slurry out of the reactor were started. 23.881 kg of feed slurry were fed, and 21.779 kg of product slurry (this amount does not include reactor contents) were collected over a 14.5 hour period. The residence time in the reactor was 1.82 hours.

The pH of the product slurry was 0.33 at equilibrium, and the $H_3PO_4$ concentration was 34%. Particle size distribution measurements indicated there was clear separation of the peak due to calcium fluoride (median particle size ranged from $0.68\mu$ early in the run to $0.76\mu$ late in the run) from the $SiO_2$ peak.

The F yield and purity of calcium fluoride, measured as in the previous example, were 102% and F:Si=207:1.

Comparative Example B

The feed slurry was prepared by adding phosphate rock powder (9.008 kg) to a solution containing FSA (18.3% F, 12.075 kg) and $H_2O$ (3.860 kg) with stirring in the feed slurry tank. After 45 hours of stirring without heating, the pH of the feed slurry was about 0.2, vs. a pH of 0.7 after 38 hours stirring in Example 2. The lower pH, despite the longer mixing time, indicates that less of the phosphate rock had reacted with the FSA solution in this example, because the addition of water decreased the reactivity of the FSA solution. Analysis of the feed slurry indicated it contained 9.55% F, 2.55% Si, 6.20% P and 13.35% Ca.

A 39% phosphoric acid solution was prepared by adding 85% $H_3PO_4$ (1.018 kg) to $H_2O$ (1.119 kg), then dissolving $Ca(OH)_2$ (0.078 kg) in the solution. This solution (1650 mL) was charged to a CSTR and heated to approximately 100° C. Then the flows of feed slurry into the reactor and product slurry out of the reactor were started. Product slurry (19.934 kg) was collected over a 14.8 hour period. The residence time in the CSTR was 1.80 hours, and the temperature was maintained at 100° C.

The pH of the product slurry was 0.7 at equilibrium, noticeably higher than in Example 2 due to the additional water fed in this example. The $H_3PO_4$ concentration in solution at equilibrium was 22%, noticeably lower than in Example 2, indicating less phosphate rock dissolution. Particle size distribution measurements indicated the median particle size of the calcium fluoride particles was significantly larger than in Example 2—median particle size ranged from $0.50\mu$ early in the run to $1.3\mu$ late in the run.

Example 3

The first reactor was filled with product slurry from a previous run (1650 mL, 2.283 kg) consisting primarily of calcium fluoride product, silica and phosphoric acid, and was then heated to 50° C.

The feed slurry was prepared by adding 9.112 kg of phosphate rock powder to a solution prepared by mixing tall oil surfactant (2.5 g), water (3.903 kg) and FSA (12.215 kg); analysis of the solution: 18.49% F, 4.33% Si. Immediately after this feed slurry was prepared, continuous pumping into the CSTR (already at 50° C.) was begun and product slurry was continuously pumped out of the CSTR for collection on a balance. Reactor temperature was maintained at 50° C., and the residence time was 1 hour.

During the 8 hour run, 19.925 kg of feed slurry was fed, 21.592 kg of product slurry, which included the reactor contents, was collected, and calcium fluoride was produced throughout the entire run. Sustained calcium fluoride nucleation at this low temperature was surprising. Earlier work had shown that 65° C. was the minimum temperature for calcium fluoride nucleation in premixed slurries, and this only after pre-mixing for a number of hours.

The pH of the product slurry was 1.1–1.2 at equilibrium. Particle size distribution measurements indicated the median particle size of the suspended calcium fluoride particles ranged from $0.45\mu$ to $0.64\mu$.

The final agglomeration of the silica was not done. Typically, the calcium fluoride particle size does not increase by more than about $0.1\mu$ during the agglomeration step.

Example 4

An FSA feed solution (13.7% F) was prepared by mixing a 65% tall oil surfactant solution (5 g), water (7.806 kg) and FSA (24.570 kg).

The reactor was charged with phosphate rock (0.671 kg) and the FSA feed solution (1.187 kg), and then rapidly heated to about 80° C. until calcium fluoride nucleation occurred as evidenced by a large sudden increase in foam level. The temperature was lowered to 50° C., and continuous feeding of phosphate rock powder and FSA feed solution was begun as well as continuous removal of product slurry. The FSA feed solution (12.883 kg) and phosphate rock powder (7.271 kg) were fed over an 8 hour period, with a reactor residence time of 1 hour. 21.674 kg of product slurry, which included the reactor contents, were collected.

The median particle size of the suspended calcium fluoride particles ranged from $0.54\mu$ to $0.75\mu$. The pH of the product slurry was 1.0 to 1.2 at equilibrium.

Example 5

An FSA feed solution was prepared by mixing a tall oil surfactant solution (3.7 g), water (5.651 kg) and FSA (17.796 kg). Analysis of the FSA feed solution indicated it contained 14.78% F.

A first reactor was charged with phosphate rock (2.724 kg) and the FSA feed solution (4.814 kg), and stirred at ambient temperature for approximately 2.5 hours. Then continuous feeding of phosphate rock powder and the FSA feed solution into the first reactor (ambient temperature, 3 hours residence time) was begun. Simultaneously, the slurry from the first reactor was pumped into a plug-flow type reactor consisting of a coil of ¼" (6.4 mm) o.d. Cu tubing immersed in an oil bath. The oil bath temperature was raised to 99° C., and maintained at approximately that temperature for the rest of the run. Nucleation of calcium fluoride occurred in the hot coil as determined by analysis of the effluent. The effluent of the coil reactor, after a 6 minute residence time, emptied into a third reactor, which was a CSTR maintained at 100° C. with a 1 hour residence time. The product slurry from the third reactor was pumped for collection to bottles on a balance. After 8.33 hours of operation, 13.304 kg of FSA feed solution and 7.507 kg of phosphate rock powder had been fed, and 23.616 kg of product, which included the reactor contents, were collected (some product loss due to spillage).

The median particle size of the suspended calcium fluoride particles ranged from $0.58\mu$ to $0.77\mu$. The pH of the product slurry was approximately 0.65 at equilibrium.

Comparative Example C

An FSA feed solution was prepared by mixing a tall oil surfactant solution, water and FSA. Analysis of the FSA feed solution indicated it contained 14.75% F.

A first reactor was charged with phosphate rock (0.824 kg) and the FSA feed solution (1.455 kg), and then stirred at ambient temperature for approximately 1 hour. Then continuous feeding of phosphate rock powder and the FSA feed solution into the first reactor (ambient temperature, 1 hour residence time) was begun. Simultaneously the slurry from the first reactor was pumped into a plug-flow type reactor consisting of a coil of ¼" o.d. (6.4 mm) Cu tubing immersed in an oil bath. The oil bath temperature was raised to 99° C., and maintained at approximately that temperature for the rest of the run. Nucleation of calcium fluoride occurred in the hot coil as determined by analysis of the effluent. The effluent of the coil reactor, after a 5.1 minute residence time, emptied into a third reactor, a CSTR maintained at 100° C. with a 1 hour residence time. The product slurry from the third reactor was pumped for collection to bottles on a balance. After 9 hours of operation, 14.357 kg of FSA feed and 8.103 kg of phosphate rock powder had been fed, and 24.626 kg of product including the reactor contents were collected.

The median particle size of the suspended calcium fluoride particles increased in size to $1.21\mu$ by the end of the run. The pH of the product slurry was approximately 0.65 at equilibrium.

Example 6

Dry calcium fluoride (24.99 g, 37.7% Ca, 37.2% F, 4.4% P, 0.15% Si; as prepared by the process of this invention) was weighed into a reactor. Air was continuously purged through the reactor and a series of downstream traps in order to carry HF volatilized during the reaction downstream to the traps.

92% $H_2SO_4$ (184.1 g) was pumped into the reactor; the calcium fluoride-$H_2SO_4$ reaction mixture was stirred continuously. The temperature of the reaction mixture was quickly raised to 120° C., and held there for 1 hour. The reactor was cooled for approximately 1 hour with continued air purge and stirring. The reactor and traps were disassembled, weighed and the contents sampled for analysis. Of the F fed to the reactor, 93.1% was recovered downstream in the traps as HF. The average HF molar concentration in the vapor phase (before it was trapped) was estimated to be greater than 71%.

The overall mass balance (contents of reactor and traps) was 99.6%.

Example 7

Dry calcium fluoride (15.08 g, 37.7% Ca, 37.2% F, 4.4% P, 0.15% Si; as prepared by the process of this invention) was weighed into the reactor. Air was continuously purged through the reactor and a series of downstream traps in order to carry HF volatilized during the reaction downstream to the traps.

To simulate a 20% calcium fluoride slurry in 28% $H_3PO_4$, $H_2O$(39.21 g) and 85% $H_3PO_4$ (21.10 g) were added to 97% $H_2SO_4$(117.14 g). The solution was mixed well, cooled and then pumped into the reactor; the reaction mixture was stirred continuously. The temperature of the reaction mixture was quickly raised to 120° C. and held there for 1 hour. The reactor was cooled for approximately 1 hour with continuous air purge and stirring. The reactor and traps were disassembled and weighed, and the contents were sampled for analysis. Of the F fed to the reactor, 33.9% was recovered downstream in the traps as HF; 50.2% of the F fed remained in the reactor. The F balance was 84.1%. $^{19}$F NMR data indicated that some of the missing F is fluoridated phosphates and sulfates. Overall mass balance (contents of reactor and traps) was 99.6%.

Example 8

Dry calcium fluoride (15.41 g, 37.7% Ca, 37.2% F, 4.4% P, 0.15% Si; as prepared by the process of this invention) was weighed into the reactor. Air was continuously purged through the reactor and a series of downstream traps in order to carry HF volatilized during the reaction downstream to the traps.

$H_2O$ (21.14 g) and 85% $H_3PO_4$ (40.33 g) were added to 97% $H_2SO_4$ (117.13 g). The solution was mixed well, cooled and then pumped into the reactor; the reaction mixture was stirred continuously. The temperature of the reaction mixture was quickly raised to 100° C., and held there for 1 hour. The reactor was cooled for approximately 1 hour with continued air purge and stirring. The reactor and traps were disassembled and weighed, and the contents were sampled for analysis. Of the F fed to the reactor, 60.0% was recovered downstream in the traps as HF; 35.4% of the F fed remained in the reactor. The F balance was 95.4%. Overall mass balance (contents of reactor and traps) was 99.6%.

What is claimed is:

1. A process for producing calcium fluoride, comprising:

mixing phosphate rock with aqueous $H_2SiF_6$ to form a first mixture;

nucleating calcium fluoride particles in the first mixture to form a second mixture;

heating the second mixture to a temperature and for a time sufficient to agglomerate $SiO_2$ particles while maintaining the calcium fluoride particles at a median size of less than about 1 micron to form a third mixture;

recovering a calcium fluoride-containing product having an F:Si ratio of greater than 50:1 from the third mixture.

2. The process of claim 1 wherein the phosphate rock is a rock powder or a water-slurried rock powder.

3. The process of claim 2 wherein the mixing and nucleating steps are carried out in a first reactor and the heating step is carried out in a second reactor.

4. The process of claim 2 wherein the rock powder or water-slurried rock powder and aqueous $H_2SiF_6$ are continuously co-fed to a first reactor, with continuous stirring at ambient temperature.

5. The process of claim 2 wherein concentration of the water-slurried rock powder is equal to or greater than about 70% solids by weight.

6. The process of claim 1 wherein the heating step is maintained at a temperature of about 90° C. to about 105° C., with a residence time of about 0.5 to 3 hours.

7. The process of claim 1 wherein the nucleating step occurs in a plug-flow type reactor.

8. The process of claim 1 wherein the calcium fluoride-containing product is a slurry of solid calcium fluoride product suspended in about 32wt. % aqueous phosphoric acid.

9. The process of claim 8 wherein the slurry is mixed with an organic solvent that is miscible with phosphoric acid.

10. The process of claim 9 wherein the organic solvent is selected from the group consisting of methanol, ethanol and isopropanol.

11. The process of claim 8 wherein excess sulfuric acid is mixed with the slurry or with dried calcium fluoride-containing product and heated to about 100° C. to produce hydrogen fluoride.

12. The process of claim 11 wherein said hydrogen fluoride contains less than about 36 wt. % water.

13. The process of claim 1 wherein calcium fluoride particles are nucleated in the nucleating step by stirring at ambient temperature for a sufficient time, heating for a sufficient initial period, adding HF to the nucleating step, or starting with a quantity of a previous run's calcium fluoride-containing product in the mixing step.

14. The process of claim 1 wherein one or more of the steps of mixing, nucleating, agglomerating and recovering are operated in a batch manner.

15. The process of claim 1 wherein one of more of the steps of mixing, nucleating, agglomerating and recovering are operated in a continuous manner.

* * * * *